(12) United States Patent
Ichikawa

(10) Patent No.: US 8,970,888 B2
(45) Date of Patent: Mar. 3, 2015

(54) FILE MANAGEMENT TECHNIQUE

(71) Applicant: Mikiya Ichikawa, Kanagawa (JP)

(72) Inventor: Mikiya Ichikawa, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 0 days.

(21) Appl. No.: 13/909,244

(22) Filed: Jun. 4, 2013

(65) Prior Publication Data

US 2013/0321651 A1 Dec. 5, 2013

(30) Foreign Application Priority Data

Jun. 5, 2012 (JP) ................................ 2012-127965

(51) Int. Cl.
*G06F 3/12* (2006.01)
*H04N 1/00* (2006.01)
*G06F 17/30* (2006.01)
*H04N 1/32* (2006.01)

(52) U.S. Cl.
CPC ............ *H04N 1/00209* (2013.01); *G06F 17/30* (2013.01); *H04N 1/00244* (2013.01); *H04N 1/0044* (2013.01); *H04N 1/32101* (2013.01); *H04N 2201/3273* (2013.01); *H04N 2201/3245* (2013.01); *H04N 1/32133* (2013.01); *H04N 2201/0084* (2013.01); *H04N 2201/3269* (2013.01); *H04N 2201/0094* (2013.01); *H04N 2201/3278* (2013.01); *H04N 2201/3225* (2013.01); *H04N 2201/3271* (2013.01); *H04N 2201/0082* (2013.01)
USPC ....................................................... 358/1.15

(58) Field of Classification Search
CPC ............. G06K 7/1417; H04N 1/00363; G06F 17/30879
USPC ....................... 358/1.12, 3.28, 1.15
See application file for complete search history.

(56) References Cited

U.S. PATENT DOCUMENTS

2010/0076976 A1* 3/2010 Sotirov et al. ................. 707/737

FOREIGN PATENT DOCUMENTS

| JP | 2010-34690 A | 2/2010 |
| JP | 2013-52615 A | 3/2013 |

* cited by examiner

*Primary Examiner* — Eric A Rust
(74) *Attorney, Agent, or Firm* — Oblon, Spivak, McClelland, Maier & Neustadt, L.L.P.

(57) ABSTRACT

An image processing system includes an image capturing apparatus and a server apparatus. The image capturing apparatus includes: an image capturing unit that captures an image of a printout produced by printing print data; an extracting unit that extracts identification information by decoding encoded information extracted from the captured image; a transmitting unit that transmits the extracted identification information to the server apparatus, and a display control unit that causes a display unit to display the captured image and related information transmitted from the server apparatus. The server apparatus includes: an identifying unit that identifies the print data stored in the storage unit in a manner associated with the identification information received from the image capturing apparatus; and a transmitting unit that transmits the related information related to the identified print data to the image capturing apparatus.

7 Claims, 12 Drawing Sheets

DOCUMENT INFORMATION

| DOCUMENT NAME | VERSION | PAGE | IDENTIFICATION INFORMATION |
|---|---|---|---|
| document.1 | Ver.2 | 1 | V2001 |
|  |  | 2 | V2002 |
|  |  | 3 | V2003 |
| document.1 | Ver.3 | 1 | V3001 |
|  |  | 2 | V3002 |
|  |  | 3 | V3003 |
| ⋮ | ⋮ | ⋮ | ⋮ |

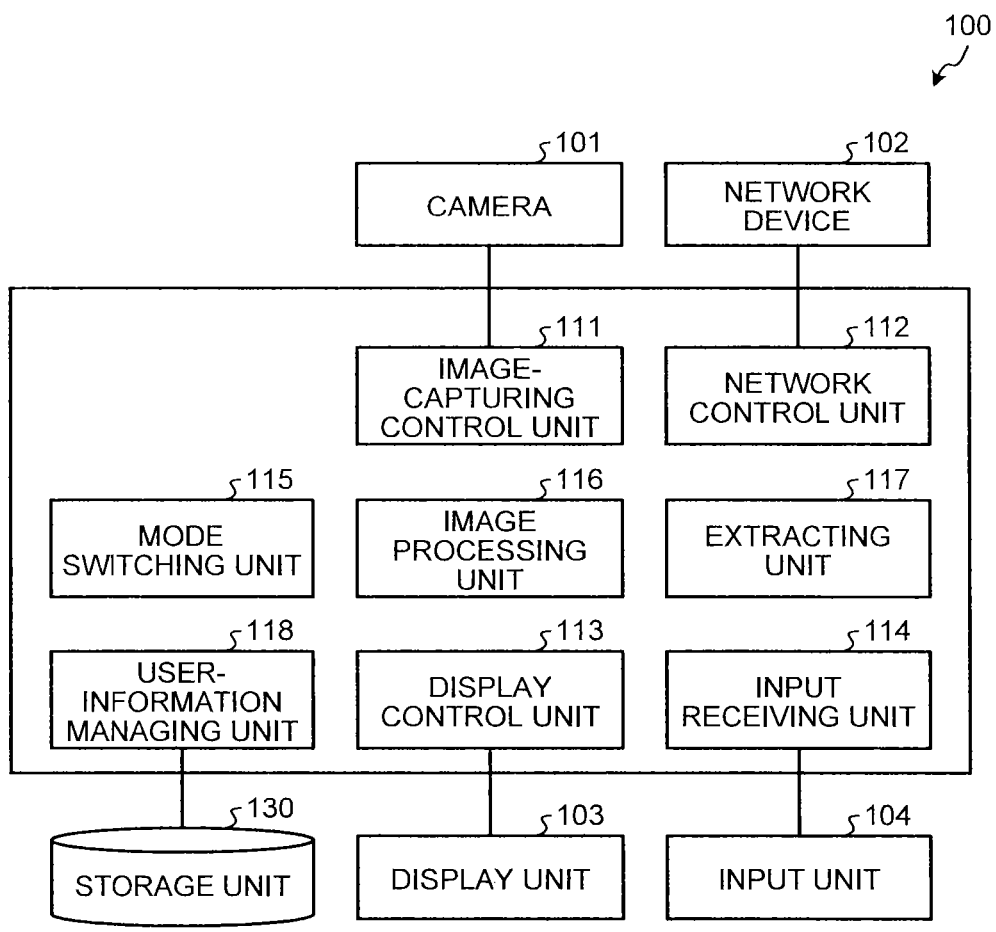

FIG.6

DOCUMENT INFORMATION

| DOCUMENT NAME | VERSION | PAGE | IDENTIFICATION INFORMATION |
|---|---|---|---|
| document.1 | Ver.2 | 1 | V2001 |
| | | 2 | V2002 |
| | | 3 | V2003 |
| document.1 | Ver.3 | 1 | V3001 |
| | | 2 | V3002 |
| | | 3 | V3003 |
| ⋮ | ⋮ | ⋮ | ⋮ |

FIG.7

ACCESS INFORMATION

| USER NAME | USER ID | ACCESS RIGHT |
|---|---|---|
| A | a001 | ALL |
| B | b002 | Ver.2 to 3 |
| ⋮ | ⋮ | ⋮ |

DOCUMENT INFORMATION

| DOCUMENT NAME | VERSION | PAGE | IDENTIFICATION INFORMATION | ADDITIONAL INFORMATION |
|---|---|---|---|---|
| document.1 | Ver.2 | 1 | V2001 | comment c1 |
| | | 2 | V2002 | comment c2, explanatory text e1 |
| | | 3 | V2003 | - |
| document.1 | Ver.3 | 1 | V3001 | comment c3 |
| | | 2 | V3002 | explanatory text e2 |
| | | 3 | V3003 | comment c4, explanatory text e3 |
| ⋮ | ⋮ | ⋮ | ⋮ | ⋮ |

FILE MANAGEMENT TECHNIQUE

CROSS-REFERENCE TO RELATED APPLICATIONS

The present application claims priority to and incorporates by reference the entire contents of Japanese Patent Application No. 2012-127965 filed in Japan on Jun. 5, 2012.

BACKGROUND OF THE INVENTION

1. Field of the Invention

The present invention relates to an image processing system, an image capturing apparatus, and a method performed by the image capturing apparatus.

2. Description of the Related Art

Conventional file management techniques to store print data of, e.g., a document in a server and manage the stored data by a plurality of people are generally known. There is also known augmented reality (AR) technology that displays, in addition to information such as a camera-captured image, information related to the captured image on a screen displayed on a display unit of a portable terminal or the like.

As such a file management technique, an image forming apparatus is disclosed in Japanese Patent Application Laid-open 2010-34690, that manages file versions for file printing purpose. Each time electronic data of a file is modified, this image forming apparatus obtains difference data representing difference between before and after the modification, and stores the obtained difference data as version data, which is information related to the electronic data. When receiving operation information related to selection of the version data, the image forming apparatus causes the selected version data to be displayed on a display screen.

However, the conventional file management technique lacks capability of management with respect to a printout produced by printing print data of a document or the like. Although such an image forming apparatus as disclosed in Japanese Patent Application Laid-open 2010-34690 can display difference on a file-by-file basis, the apparatus lacks capability of additionally displaying information, such as the difference data, with respect to a printed document (printout), resulting in poor convenience.

In view of the above, there exists a need for an image processing system, an image capturing apparatus, and a server apparatus that can increase convenience.

SUMMARY OF THE INVENTION

It is an object of the present invention to at least partially solve the problems in the conventional technology.

An image processing system includes an image capturing apparatus and a server apparatus. The image capturing apparatus includes: an image capturing unit that captures an image of a printout produced by printing print data and encoded information, the encoded information being obtained by encoding identification information for identification of the print data; an extracting unit that extracts the identification information by extracting encoded information from the image captured by the image capturing unit and decoding the extracted encoded information; a first transmitting unit that transmits the identification information extracted by the extracting unit to the server apparatus; a first receiving unit that receives related information related to the print data and transmitted from the server apparatus based on the identification information transmitted by the first transmitting unit; and a display control unit that causes a display unit to display the image captured by the image capturing unit and the related information received by the first receiving unit. The server apparatus includes: a first storage unit that stores therein the print data and the identification information for identification of the print data in a manner associated with each other, a second receiving unit that receives the identification information transmitted from the image capturing apparatus; an identifying unit that looks for identification information corresponding to the identification information received by the second receiving unit from the identification information stored in the first storage unit, and identifies the print data stored in the first storage unit in a manner associated with the looked-for identification information; and a second transmitting unit that transmits the related information related to the print data identified by the identifying unit to the image capturing apparatus.

An image capturing apparatus is connected to a server apparatus over a network. The image capturing apparatus includes: an image capturing unit that captures an image of a printout produced by printing print data and encoded information, the encoded information being obtained by encoding identification information for identification of the print data; an extracting unit that extracts the identification information by extracting the encoded information from the image captured by the image capturing unit and decoding the extracted encoded information; a transmitting unit that transmits the identification information extracted by the extracting unit to the server apparatus; a receiving unit that receives related information transmitted from the server apparatus based on the identification information transmitted by the transmitting unit, the related information being related to the print data; and a display control unit that causes a display unit to display the image captured by the image capturing unit and the related information received by the receiving unit.

A method is preformed by an image capturing apparatus connected to a server apparatus over a network. The method includes: capturing an image of a printout produced by printing print data and encoded information, the encoded information being obtained by encoding identification information for identification of the print data; extracting the identification information by extracting the encoded information from the image captured at the capturing and decoding the extracted encoded information; transmitting the identification information extracted at the extracting to the server apparatus; receiving related information transmitted from the server apparatus based on the identification information transmitted at the transmitting, the related information being related to the print data; and causing a display unit to display the image captured at the capturing and the related information received at the receiving.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2 is a block diagram illustrating a configuration of a portable terminal according to the first embodiment;

FIG. 3 is a diagram illustrating an example of user information;

FIG. 6 is a diagram illustrating an example of document information;

FIG. 7 is a diagram illustrating an example of access information;

DETAILED DESCRIPTION OF THE PREFERRED EMBODIMENTS

Embodiments are described in detail below with reference to the accompanying drawings.

First Embodiment

Figure 1:
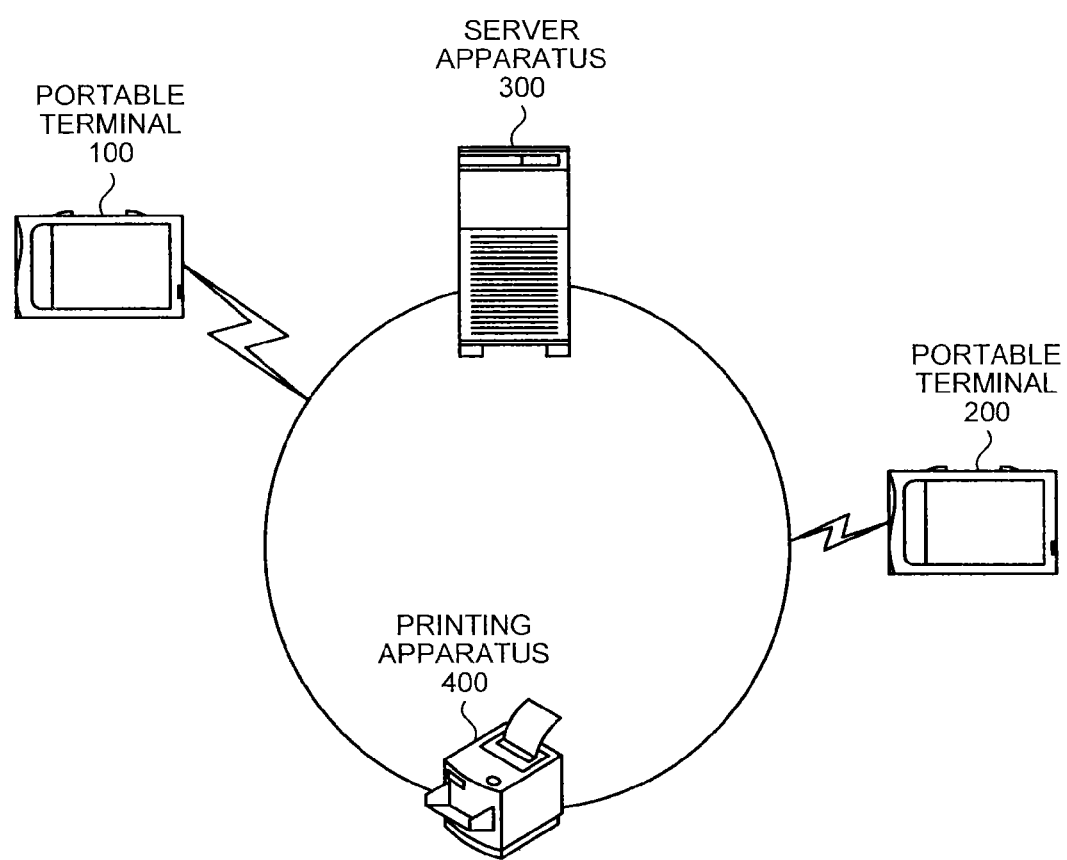
FIG. 1 is a configuration diagram of an image processing system according to a first embodiment.

FIG. 1 is a configuration diagram of an image processing system according to a first embodiment. As illustrated in FIG. 1, the image processing system according to the present embodiment includes portable terminals 100 and 200, each of which is an example of an image capturing apparatus, a server apparatus 300, and a printing apparatus 400 that are connected over a network.

The server apparatus 300 stores therein and manages co-managed document data (print data). The printing apparatus 400 is an apparatus, such as a printer or a multifunction peripheral (MFP), capable of image forming (printing) and prints document data. Embodiments below are described by way of examples in each of which a processing object is a printout produced by printing document data; however, what is printed on the printout is not necessarily a document. Similar processing can be performed on a printout produced by printing an image or the like.

The portable terminal 100, 200 captures an image of a printout produced by printing document data and displays the captured image on a screen. The present embodiment is described by way of an example in which the portable terminals are used on a user-by-user basis. Alternatively, a configuration in which a single portable terminal is used by a plurality of users can be employed. The image processing system according to the present embodiment includes, but not limited thereto, the two portable terminals connected to the system. Alternatively, the image processing system may include one connected portable terminal, or three or more connected portable terminals.

In the image processing system according to the present embodiment, the portable terminal 100 captures an image of a printout produced by the printing apparatus 400 by printing document data. The portable terminal 100 transmits information for identification of the document data or the like contained in the captured image to the server apparatus 300. In response thereto, the server apparatus 300 transmits information related to the document data to the portable terminal 100. The portable terminal 100 displays a composite image of the received information and the captured image. This is described below more specifically.

The portable terminal 100 is described first. FIG. 2 is a block diagram illustrating a configuration of the portable terminal according to the first embodiment. The portable terminal 200 has a similar configuration to that of the portable terminal 100 described below. As illustrated in FIG. 2, the portable terminal 100 includes a camera 101, a network device 102, a display unit 103, an input unit 104, a storage unit 130, an image-capturing control unit 111, a network control unit 112, a display control unit 113, an input receiving unit 114, a mode switching unit 115, an image processing unit 116, an extracting unit 117, and a user-information managing unit 118.

The storage unit 130 is a storage medium, such as a hard disk drive (HDD) or a memory, that stores therein user information for identification of a user of the portable terminal 100. FIG. 3 is a diagram illustrating an example of the user information. As illustrated in FIG. 3, the user information contains a name of a user "A" associated with user ID "a001" that is unique to the user. The user information only about the user A is registered, because a situation in which a single user uses a single portable terminal is illustrated in the present embodiment. However, in a situation where a plurality of users use a single portable terminal, user information in which user IDs are associated on a user-by-user basis is to be stored. The storage unit 130 corresponds to a second storage unit.

The camera 101 captures an image of an object. The image-capturing control unit 111 controls image capturing performed by the camera 101. Specifically, the image-capturing control unit 111 causes the camera 101 to capture an image of a printout produced by printing document data and encoded information, which is obtained by encoding identification information for identification of the document data.

Examples of the "encoded information" include Quick Response Codes (QR codes) (registered trademark) and Anoto patterns. The encoded information of the present embodiment is obtained by encoding identification information that indicates which document data (more specifically, a document name), which version of the document data, and which page of the document data is printed on the printout. The encoded information does not necessarily utilize QR codes or Anoto patterns, but may utilize any other method capable of identifying document data by image capture by the camera 101.

The network device 102 allows connection to the server apparatus 300 and the printing apparatus 400. The network control unit 112 controls the network device 102 to exchange various information with the server apparatus 300 and the printing apparatus 400 via the network device 102. Specifically, the network control unit 112 transmits identification information extracted by the extracting unit 117, a request for difference information, and user information stored in the storage unit 130 to the server apparatus 300. The network control unit 112 also receives difference information, which is generated based on the transmitted identification information, from the server apparatus 300.

The "difference information" is information (related information) related to the document data of the printout or, more specifically, information representing difference between the document data of the printout and a different version of the same document data (hereinafter, "another version of the document data"). In the first embodiment, "another version of the document data" denotes a latest version among versions of the document data, to which a user of the portable terminal 100 is permitted to access.

The display unit 103 is a display or the like that displays a character and/or an image thereon. The display control unit 113 controls the display unit 103. Specifically, the display control unit 113 causes a composite image of the printout image captured by the camera 101 and the difference information received from the server apparatus 300, to be displayed on the display unit 103.

Figure 4:
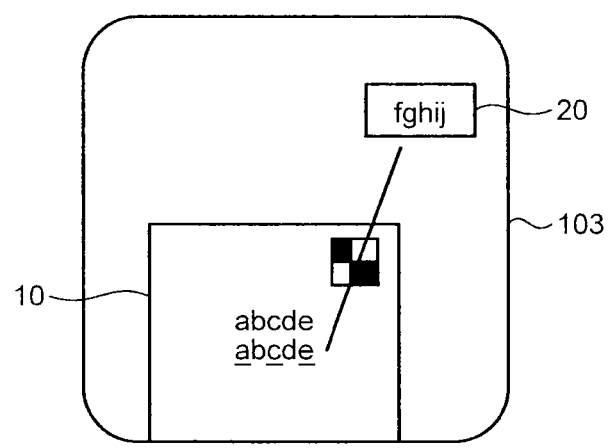
FIG. 4 is a diagram illustrating a display unit displaying difference information thereon.

FIG. 4 is a diagram illustrating an example of the display unit displaying difference information thereon. As illustrated in FIG. 4, a captured image of a printout 10 and difference information 20 between document data of the printout 10 and a latest version of the document data are displayed on the display unit 103. To indicate a portion to which the difference information 20 relates, the difference information 20 is displayed as being connected to the portion with a line.

The input unit 104 includes various buttons to be operated by a user, a display, and/or the like. The input receiving unit 114 receives various inputs entered via the input unit 104.

The mode switching unit 115 switches a display mode according to an input entered by a user. The "display mode" defines a method of displaying a captured printout image obtained by the camera 101 and includes "latest difference display mode", "additional information display mode", and "designated difference display mode".

The "latest difference display mode" is to display the captured printout image and difference information, which represents difference between document data of the captured printout and a latest version of the print data, on the display unit 103. The "additional information display mode" is to display the captured printout image and additional information, which accompanies the document data of the captured printout, on the display unit 103. The "designated difference display mode" is to display the captured printout image and difference information, which represents difference between the document data of the captured printout and a designated version of the print data, on the display unit 103. In the present embodiment, an example where the display mode is set to the "latest difference display mode" is described. An example where the display mode is set to the "additional information display mode" is described in a second embodiment. An example where the display mode is set to the "designated difference display mode" is described in a third embodiment.

The image processing unit 116 performs image processing on the captured printout image. For instance, the image processing performed by the image processing unit 116 performs image processing of creating a composite image of the captured printout image and the difference information received from the server apparatus 300.

The extracting unit 117 extracts the identification information of the captured document data by extracting the encoded information from the image captured by the camera 101 and decoding the extracted encoded information.

The user-information managing unit 118 manages user information stored in the storage unit 130.

Figure 5:
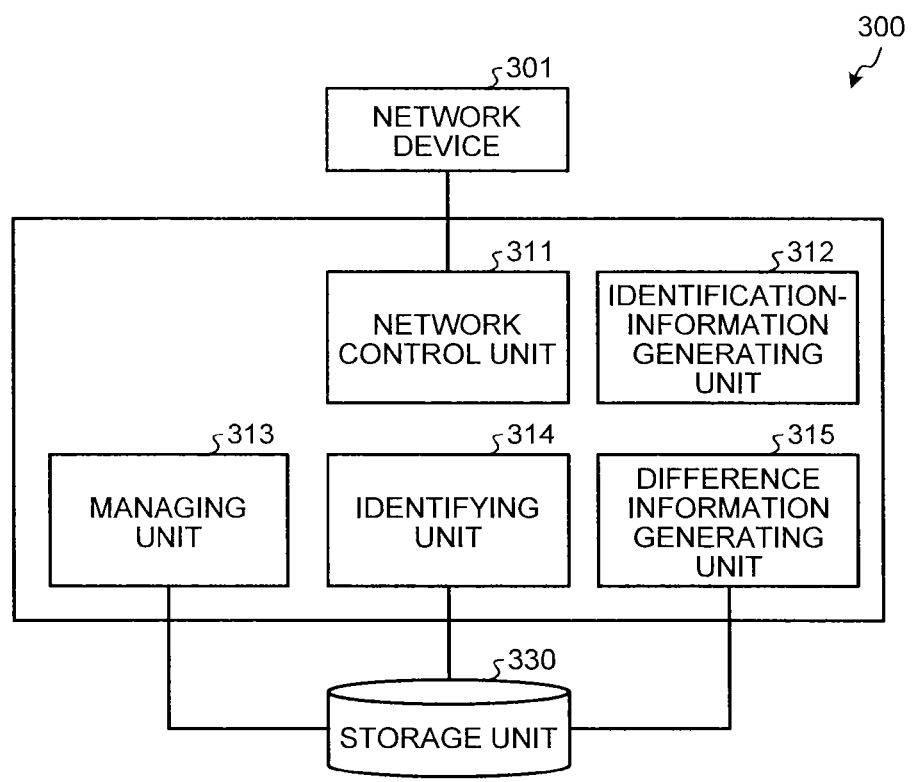
FIG. 5 is a block diagram illustrating a configuration of a server apparatus according to the first embodiment.

The server apparatus 300 is described below. FIG. 5 is a block diagram illustrating a configuration of the server apparatus according to the first embodiment. As illustrated in FIG. 5, the server apparatus 300 includes a network device 301, a storage unit 330, a network control unit 311, an identification-information generating unit 312, a managing unit 313, an identifying unit 314, and a difference-information generating unit 315.

The storage unit 330 is a storage medium, such as an HDD or a memory, that stores therein document data. The storage unit 330 also stores therein document information (print information) that contains a document name of document data to be printed to produce a printout, a version of the document data, a page number of the document data, and identification information of the document data that are associated with one another. FIG. 6 is a diagram illustrating an example of the document information. As illustrated in FIG. 6, the document information contains document names "document.1", . . . , versions "Ver.2", page numbers "1", "2", . . . , and identification information "V2001", "V2002", . . . that are associated with one another. The storage unit 330 also stores therein an earlier version of the document data associated with identification information.

The storage unit 330 also stores therein access information that contains user information about a user(s) and access right associated with the user information. The access right defines the version of the document data to which the user is permitted to access. FIG. 7 is a diagram illustrating an example of the access information. As illustrated in FIG. 7, user names "A", . . . , user IDs "a001", . . . , and access rights "ALL", . . . are associated with one another. The storage unit 330 corresponds to a first storage unit and a third storage unit.

The network device 301 allows connection to the portable terminals 100 and 200 and the printing apparatus 400. The network control unit 311 controls the network device 301 to exchange various information with the portable terminals 100 and 200 and the printing apparatus 400 via the network device 301. Specifically, the network control unit 311 receives identification information of document data, user information, and a request for difference information from the portable terminal 100. The network control unit 311 also transmits difference information generated by the difference-information generating unit 315 to the portable terminal 100. The network control unit 311 also transmits a print command together with document data appended by encoded information, which is obtained by encoding the identification information, to the printing apparatus 400.

The identification-information generating unit 312 generates identification information that indicates a version and a page number of the document data and generates encoded information by encoding the identification information. In the present embodiment, when the server apparatus 300 transmits a print command to the printing apparatus 400 while transmitting document data stored in the storage unit 330, encoded information is appended to the document data on a page-by-page basis. At this time, the identification-information generating unit 312 generates identification information and encoding the identification information. The identification-information generating unit 312 stores the generated identification information in the storage unit 330 in a manner associated with the document information.

Here, the server apparatus 300 generates the identification information and the encoded information; however, it is not limited thereto. Specifically, for instance, the following method can be employed. The server apparatus 300 transmits a document name, a version, a page number, user information, and the like of document data to the printing apparatus

400. The printing apparatus 400 generates identification information and prints the document data with encoded information, which is generated from the identification information, appended thereto. The identification information is transmitted over the network from the printing apparatus 400 to the server apparatus 300, where the identification information is stored in the storage unit 330 in a manner associated with the document information. There can be employed a configuration in which, when the version of the document data changes, the identification information is changed in synchronization therewith, and stored in the server apparatus 300 in a manner associated with the document information.

The managing unit 313 maintains and manages the access information stored in the storage unit 330. The managing unit 313 also maintains and manages the document data and the document information stored in the storage unit 330.

When the network control unit 311 receives user information, identification information, and a request for difference information from the portable terminal 100, The identifying unit 314 identifies print data accesses the document information stored in the storage unit 330 to look for the received identification information from identification information stored in the document information, and identifies print data stored in the document information in a manner associated with the searched-for identification information, as the document data of the printout, an image of which is captured by the portable terminal 100.

The difference-information generating unit 315 generates difference information within user's access right by consulting the access information stored in the storage unit 330. Specifically, the difference-information generating unit 315 extracts difference using a known technique by comparing the document data identified by the identifying unit 314 against a latest version among versions of the document data permitted by access right associated with the user information (user name, user ID) received from the portable terminal 100, and generates difference information based on the extracted difference. The difference information is generated on a page-by-page basis of the document data. The difference-information generating unit 315 corresponds to a generating unit.

A specific example is described below with reference to FIG. 7. Upon receiving a request for difference information from a portable terminal used by the user A, the server apparatus 300 generates difference information based on difference between identified document data and a latest version among all the versions of the document data; this is because the user A has access right to all the versions of the document data. In a case of a user B, the server apparatus 300 generates difference information based on difference between the identified document data and a latest version among versions 2 through 3 (Ver.2 to Ver.3) of the document data; this is because the user B has access right to the versions 2 through 3 of the document data.

Figure 8:
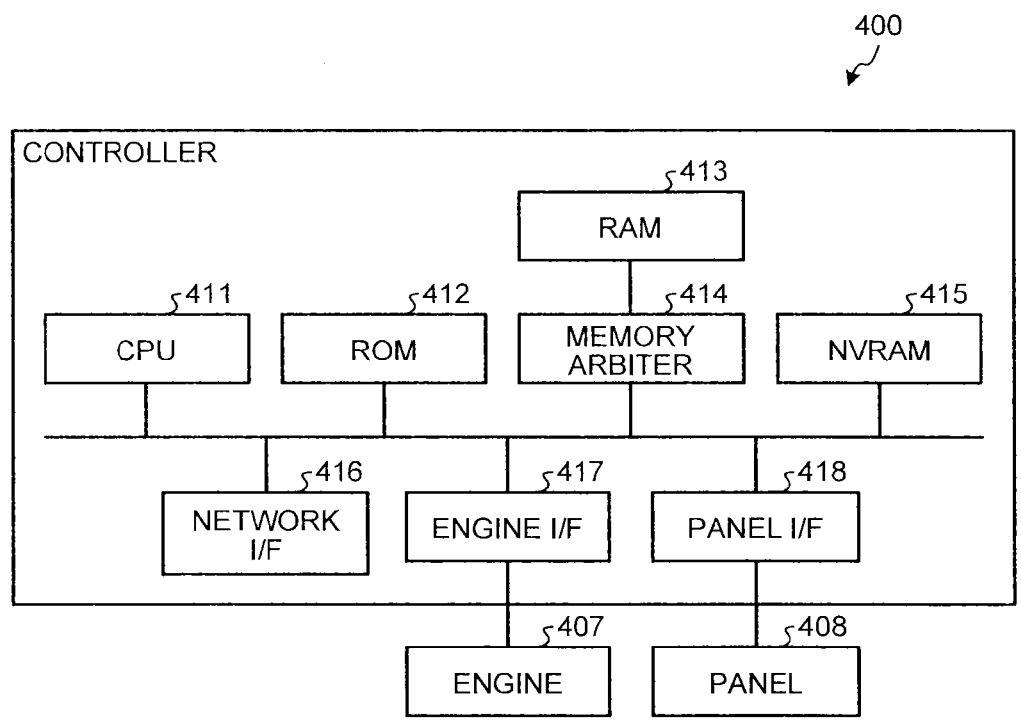
FIG. 8 is a configuration diagram of a printing apparatus according to the first embodiment.

The printing apparatus 400 is described below. FIG. 8 is a configuration diagram of the printing apparatus according to the first embodiment. The printing apparatus 400 includes a controller that controls the apparatus, an engine 407 that prints an image of document data or the like on a recording medium such as paper, and a panel 408, from which a user enters inputs and which displays an apparatus status.

The controller includes a central processing unit (CPU) 411, a read only memory (ROM) 412, a random access memory (RAM) 413, a memory arbiter 414, a non-volatile RAM (NVRAM) 415, a network interface (I/F) 416, an engine I/F 417, and a panel I/F 418.

The CPU 411 executes instructions of software programs. The ROM 412 stores therein the programs to be run on the controller. The RAM 413 serves as a page memory created by the controller and/or a working memory necessary for running the software. The memory arbiter 414 controls access to the RAM 413. The NVRAM 415 is a non-volatile memory that stores therein print condition settings for the printing apparatus 400 and the like. The network I/F 416 is to exchange data with the server apparatus 300 connected to the network. The engine I/F 417 is to exchange print commands and the like with the engine 407. The panel I/F 418 is to perform input and output with the panel 408.

Figure 9:
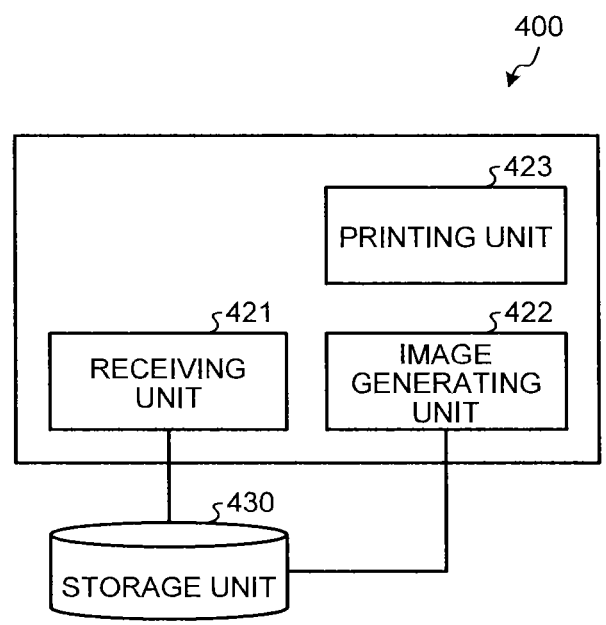
FIG. 9 is a block diagram illustrating a configuration of the printing apparatus according to the first embodiment.

FIG. 9 is a block diagram illustrating a configuration of the printing apparatus according to the first embodiment. As illustrated in FIG. 9, the printing apparatus 400 includes a storage unit 430, a receiving unit 421, an image generating unit 422, and a printing unit 423.

The storage unit 430 is a storage medium, such as an HDD or a memory, that stores therein document data received from the server apparatus 300. The receiving unit 421 receives a print command together with document data, to which encoded information is appended, from the server apparatus 300. The image generating unit 422 generates a print image based on the document data received from the server apparatus 300. The printing unit 423 causes the engine 407 to print the document data.

Figure 10:
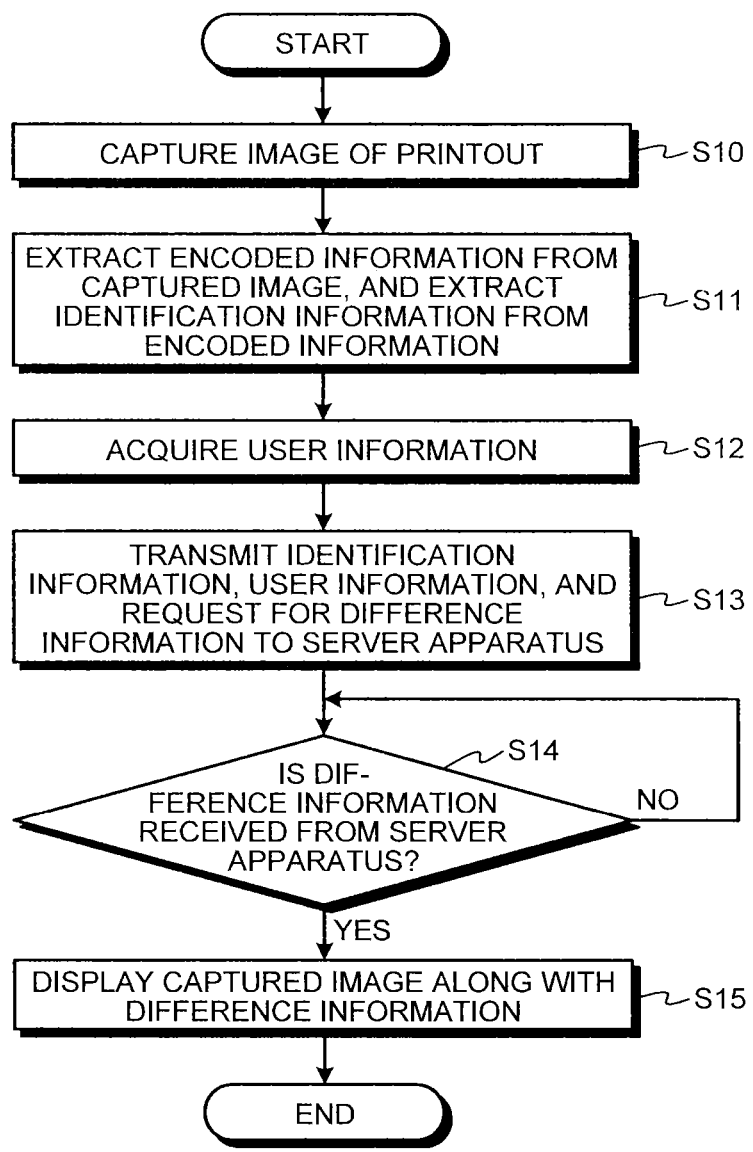
FIG. 10 is a flowchart illustrating a process flow of a display process of difference information in the portable terminal according to the first embodiment.

A display process of difference information in the portable terminal 100 is described below. FIG. 10 is a flowchart illustrating a process flow of the display process of the difference information in the portable terminal according to the first embodiment. The display process is performed after the input receiving unit 114 has received an input to set the display mode to the latest difference display mode from a user through the input unit 104 and, in response thereto, the mode switching unit 115 has set the display mode to the latest difference display mode.

The image-capturing control unit 111 causes the camera 101 to capture an image of a printout (Step S10). Subsequently, the extracting unit 117 extracts encoded information from the captured printout image and extracts identification information from the extracted encoded information (Step S11). The user-information managing unit 118 acquires user information (Step S12).

The network control unit 112 transmits the extracted identification information, the acquired user information, and a request for difference information to the server apparatus 300 (Step S13). The image processing unit 116 determines whether or not difference information is received from the server apparatus 300 (Step S14). When difference information is not received (No at Step S14), the image processing unit 116 is on standby until receiving difference information.

On the other hand, when difference information is received (Yes at Step S14), the image processing unit 116 creates a composite image of the captured printout image and the received difference information, and the display control unit 113 causes the display unit 103 to display the composite image (Step S15).

Figure 11:
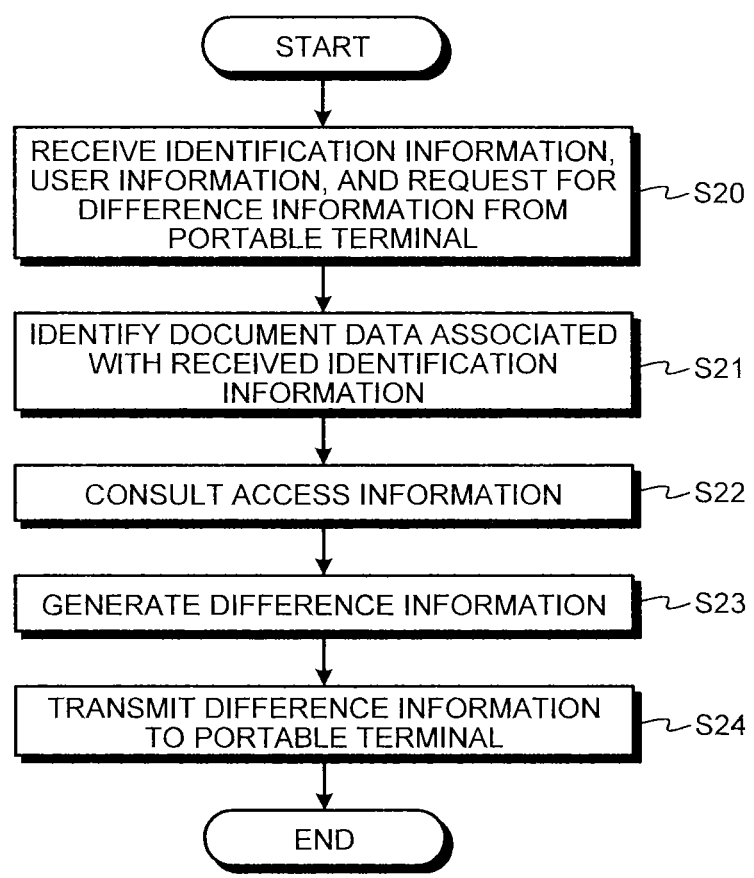
FIG. 11 is a flowchart illustrating a process flow of a display process of the difference information in the server apparatus according to the first embodiment.

A display process of the difference information in the server apparatus 300 is described below. FIG. 11 is a flowchart illustrating a process flow of the display process of the difference information in the server apparatus according to the first embodiment.

The network control unit 311 receives the identification information, the user information, and the request for difference information from the portable terminal 100 (Step S20).

The identifying unit 314 identifies document data associated with the received identification information by consulting the document information (Step S21). The difference-information generating unit 315 consults the access information stored in the storage unit 330 (Step S22) to generate difference information within user's access right (Step S24).

The network control unit 311 transmits the generated difference information to the portable terminal 100 (Step S24).

In this way, in the image processing system according to the present embodiment, the portable terminal 100 captures an image of a printout produced by printing document data, and transmits identification information obtained by decoding encoded information contained in the captured image, a request for difference information, and the like to the server apparatus 300. In response thereto, the server apparatus 300 generates difference information between the document data and a latest version of the document data according to access right, and transmits the difference information to the portable terminal 100. The portable terminal 100 displays a composite image of the received difference information and the captured printout image. Thus, the portable terminal 100 can display the document data of the captured printout together with the difference between the document data of the printout and another version (the latest version) of the document data. Accordingly, a user can know the contents of the latest version of the document data without printing the latest version of the document data, which increases convenience.

Second Embodiment

In the first embodiment, the portable terminal receives difference information between document data of a printout and a latest version of the document data from the server apparatus, and displays a composite image of the difference information and a captured image. By contrast, in the second embodiment, a portable terminal receives additional information accompanying document data of a printout from a server apparatus, and displays a composite image of the additional information and a captured image.

An image processing system and a printing apparatus according to the second embodiment are similar to those of the first embodiment in configuration (see FIG. 1). Portable terminals according to the second embodiment are also similar to those of the first embodiment in configuration. Only portions of the portable terminal of the second embodiment that differ from that of the first embodiment are described with reference to FIG. 2.

The network control unit 112 controls the network device 102 to exchange various information with a server apparatus 500 and the printing apparatus 400 via the network device 102. Specifically, the network control unit 112 transmits identification information extracted by the extracting unit 117, a request for additional information, and user information stored in the storage unit 130 to the server apparatus 500. The network control unit 112 also receives additional information, which is acquired based on the transmitted identification information, from the server apparatus 500.

The "additional information" is information (related information) related to document data of a printout or, more specifically, information accompanying the document data of the printout. Examples of the additional information, which is information other than body text of the document data, include a comment and/or explanatory text.

The display control unit 113 controls the display unit 103. Specifically, the display control unit 113 causes a composite image of a printout image captured by the camera 101 and additional information received from the server apparatus 500, to be displayed on the display unit 103.

The image processing unit 116 performs image processing on the captured printout image. For instance, the image processing unit 116 performs image processing of creating a composite image of the captured printout image and the additional information received from the server apparatus 500.

Figures 12, 13:
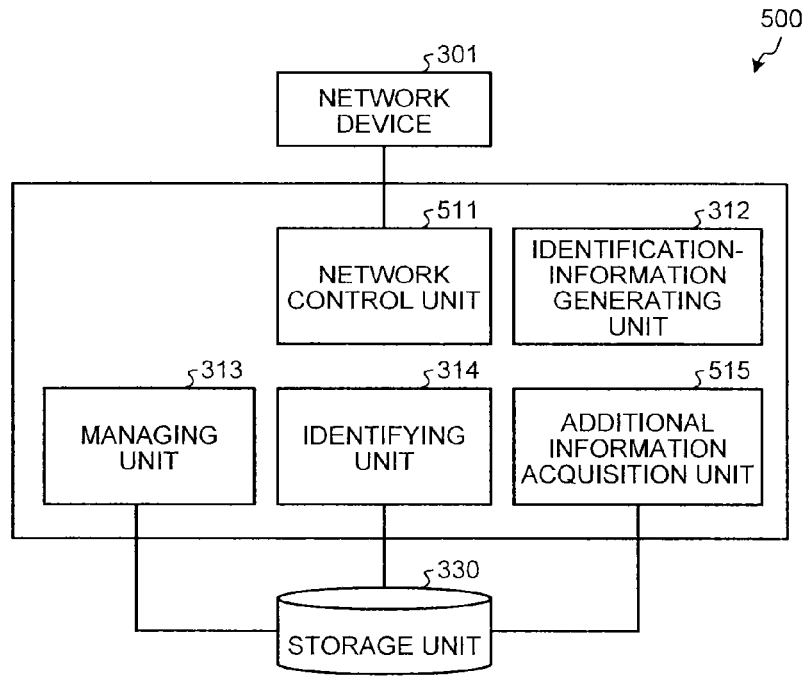
FIG. 12 is a block diagram illustrating a configuration of a server apparatus according to a second embodiment.
FIG. 13 is a diagram illustrating an example of document information.

The server apparatus 500 is described below. FIG. 12 is a block diagram illustrating a configuration of the server apparatus according to the second embodiment. As illustrated in FIG. 12, the server apparatus 500 includes the network device 301, the storage unit 330, a network control unit 511, the identification-information generating unit 312, the managing unit 313, the identifying unit 314, and an additional-information acquisition unit 515. The network device 301, the identification-information generating unit 312, the managing unit 313, and the identifying unit 314 of the second embodiment are similar to those of the first embodiment in configuration and function.

In the present embodiment, the storage unit 330 stores therein document information containing a document name of document data to be printed to produce a printout, a version of the document data, a page number of the document data, identification information of the document data, and additional information accompanying the document data that are associated with one another. FIG. 13 is a diagram illustrating an example of the document information. As illustrated in FIG. 13, the document information contains document names "document.1" . . . , versions "Ver.2" . . . , page numbers "1", "2", . . . , identification information "V2001", "V2002", . . . , and additional information "comment c1", "comment c2, explanatory text e1", . . . that are associated with one another. As in the first embodiment, the storage unit 330 also stores therein document data and access information.

The network control unit 511 controls the network device 301 to exchange various information with the portable terminals 100 and 200 and the printing apparatus 400 via the network device 301. Specifically, the network control unit 511 receives identification information of print data, and a request for additional information from the portable terminal 100. The network control unit 511 also transmits additional information acquired by the additional-information acquisition unit 515 to the portable terminal 100. The network control unit 511 also transmits a print command together with document data appended by encoded information, which is obtained by encoding the identification information, to the printing apparatus 400.

The additional-information acquisition unit 515 acquires additional information within user's access right by consulting the access information stored in the storage unit 330. Specifically, the additional-information acquisition unit 515 acquires additional information that corresponds to the document data identified by the identifying unit 314 and is of the document data, a version of which is permitted by access right associated with the user information (user name, user ID) received from the portable terminal 100. The additional-information acquisition unit 515 corresponds to an acquisition unit.

Figure 14:
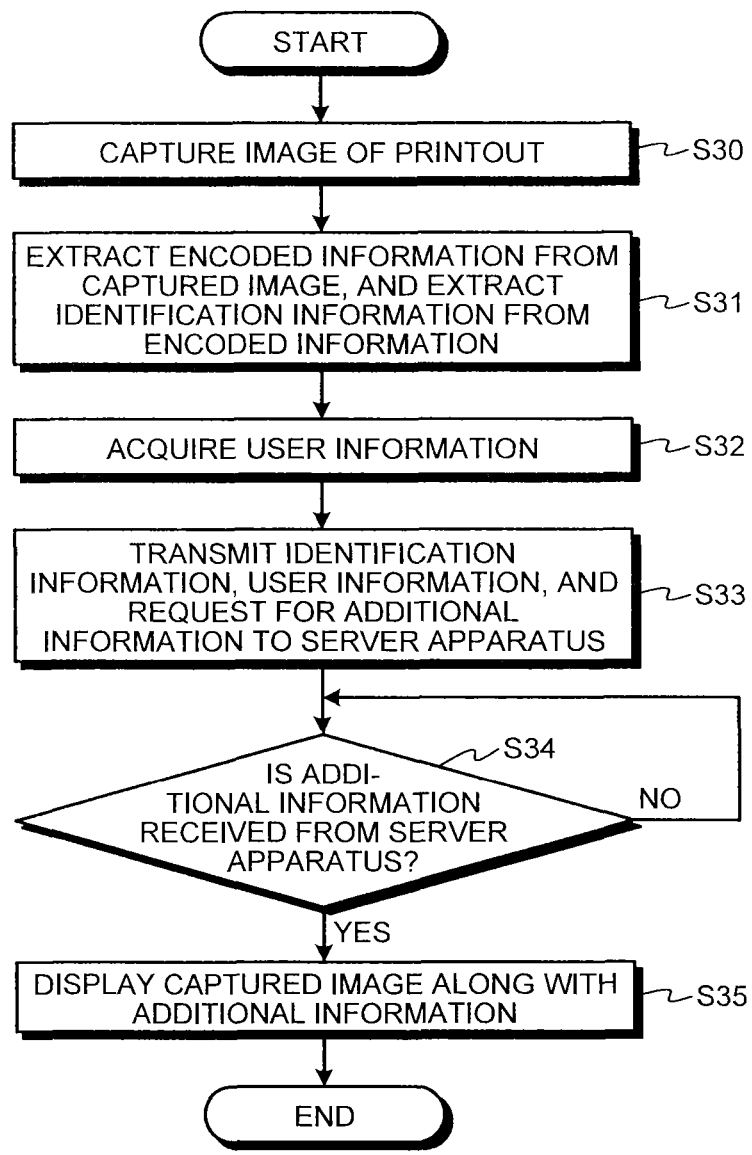
FIG. 14 is a flowchart illustrating a process flow of a display process of additional information in the portable terminal according to the second embodiment.

A display process of additional information in the portable terminal 100 is described below. FIG. 14 is a flowchart illustrating a process flow of the display process of additional information in the portable terminal according to the second embodiment. The display process is performed after the input receiving unit 114 has received an input to set the display mode to the additional information display mode from a user through the input unit 104 and, in response thereto, the mode switching unit 115 has set the display mode to the additional information display mode.

The image-capturing control unit 111 causes the camera 101 to capture an image of a printout (Step S30). Subsequently, the extracting unit 117 extracts encoded information from the captured printout image and extracts identification information from the extracted encoded information (Step S31). The user-information managing unit 118 acquires user information (Step S32).

The network control unit 112 transmits the extracted identification information, the acquired user information, and a request for additional information to the server apparatus 500 (Step S33). The image processing unit 116 determines whether or not additional information is received from the server apparatus 500 (Step S34). When additional information is not received (No at Step S34), the image processing unit 116 is on standby until receiving additional information.

On the other hand, when additional information is received (Yes at Step S34), the image processing unit 116 creates a composite image of the captured printout image and the received additional information, and the display control unit 113 causes the display unit 103 to display the composite image (Step S35).

Figure 15:
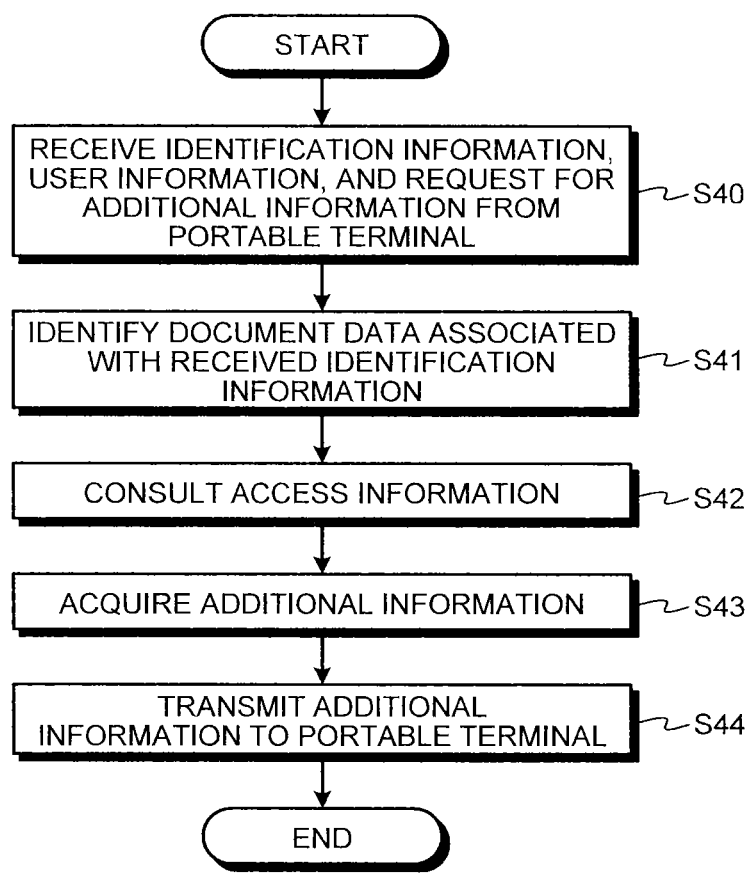
FIG. 15 is a flowchart illustrating a process flow of a display process of the additional information in the server apparatus according to the second embodiment.

A display process of the additional information in the server apparatus 500 is described below. FIG. 15 is a flowchart illustrating a process flow of the display process of the additional information in the server apparatus according to the second embodiment.

The network control unit 511 receives the identification information, the user information, and the request for additional information from the portable terminal 100 (Step S40). The identifying unit 314 then identifies document data associated with the received identification information by consulting the document information (Step S41). The additional-information acquisition unit 515 consults the access information stored in the storage unit 330 (Step S42) to acquire additional information associated with the document data identified by consulting the document information within user's access right (Step S43).

The network control unit 511 transmits the acquired additional information to the portable terminal 100 (Step S44).

In this way, in the image processing system according to the present embodiment, the portable terminal 100 captures an image of a printout produced by printing document data, and transmits identification information obtained by decoding encoded information contained in the captured image, a request for additional information, and the like to the server apparatus 500. In response thereto, the server apparatus 500 acquires additional information accompanying the document data according to access right, and transmits the additional information to the portable terminal 100. The portable terminal 100 displays a composite image of the received additional information and the captured printout image. Thus, the portable terminal 100 can display the captured document data of the printout together with the additional information (e.g., a comment and/or explanatory text), which is information other than body text of the document data. Accordingly, a user can know contents of the additional information accompanying the document data without printing the additional information, which increases convenience.

Third Embodiment

In the first embodiment, the portable terminal receives difference information between document data of the printout and a latest version of the document data from the server apparatus, and displays a composite image of the difference information and a captured image. By contrast, in the present embodiment, a portable terminal receives difference information between document data of a printout and a user-designated version of the document data from a server apparatus, and displays a composite image of the difference information and a captured image.

An image processing system and a printing apparatus according to the third embodiment are similar to those of the first embodiment in configuration (see FIG. 1). Portable terminals according to the third embodiment are also similar to those of the first embodiment in configuration. Only portions of the portable terminal of the third embodiment that differ from those of the first embodiment are described with reference to FIG. 2.

The input receiving unit 114 receives various inputs entered using the input unit 104. Specifically, the input receiving unit 114 receives designation of a version of document data entered using the input unit 104 by a user that desires difference information between document data of the printout and the designated version of the document data to be displayed.

As in the first embodiment, the "difference information" is information (related information) related to the document data of a printout or, more specifically, information representing difference between the document data of the printout and document data of a version that is different from a version of the document data of the printout. In the present embodiment, "another version of the document data" denotes a user-designated version of the document data, access to which is permitted to a user of the portable terminal 100.

The network control unit 112 controls the network device 102 to exchange various information with the server apparatus 300 and the printing apparatus 400 via the network device 102. Specifically, the network control unit 112 transmits user information and an inquiry for a version(s) within access right given to the user to the server apparatus 300, and receives version information as a response to the inquiry from the server apparatus 300. The network control unit 112 also transmits identification information extracted by the extracting unit 117, a request for difference information, user information stored in the storage unit 130, and designation of a version to the server apparatus 300. The network control unit 112 also receives difference information, which is generated based on the transmitted identification information, from the server apparatus 300.

The server apparatus according to the third embodiment is also similar to that of the first embodiment in configuration. Only portions that differ from those of the first embodiment are described with reference to FIG. 5.

The network control unit 311 controls the network device 301 to exchange various information with the portable terminals 100 and 200 and the printing apparatus 400 via the network device 301. Specifically, the network control unit 311 receives a version inquiry from the portable terminal 100, and transmits version information generated by the managing unit 313 to the portable terminal 100. The network control unit 311 also receives identification information of print data, user information, a request for difference information, and designation of a version from the portable terminal 100. The network control unit 311 also transmits difference information generated by the difference-information generating unit 315 to the portable terminal 100. The network control unit 311 also transmits a print command together with document data appended by encoded information, which is obtained by encoding the identification information, to the printing apparatus 400.

The managing unit 313 maintains and manages the access information stored in the storage unit 330. The managing unit 313 also maintains and manages the document data and the document information stored in the storage unit 330. Upon receiving user information along with a version inquiry from the portable terminal 100, the managing unit 313 consults the access information and the document information to generate version information that indicates a version(s) of the document data to which the user is permitted to access within access right associated with the received user information.

The difference-information generating unit 315 generates difference information within access right of the user by consulting the access information stored in the storage unit 330. Specifically, the difference-information generating unit 315 extracts difference using a known technique by comparing document data identified by the identifying unit 314 against document data of a version that is designated and is permitted by access right associated with user information (user name, user ID) received from the portable terminal 100, and generates difference information based on the extracted difference. The difference information is generated on a page-by-page basis of the document data.

Figure 16:
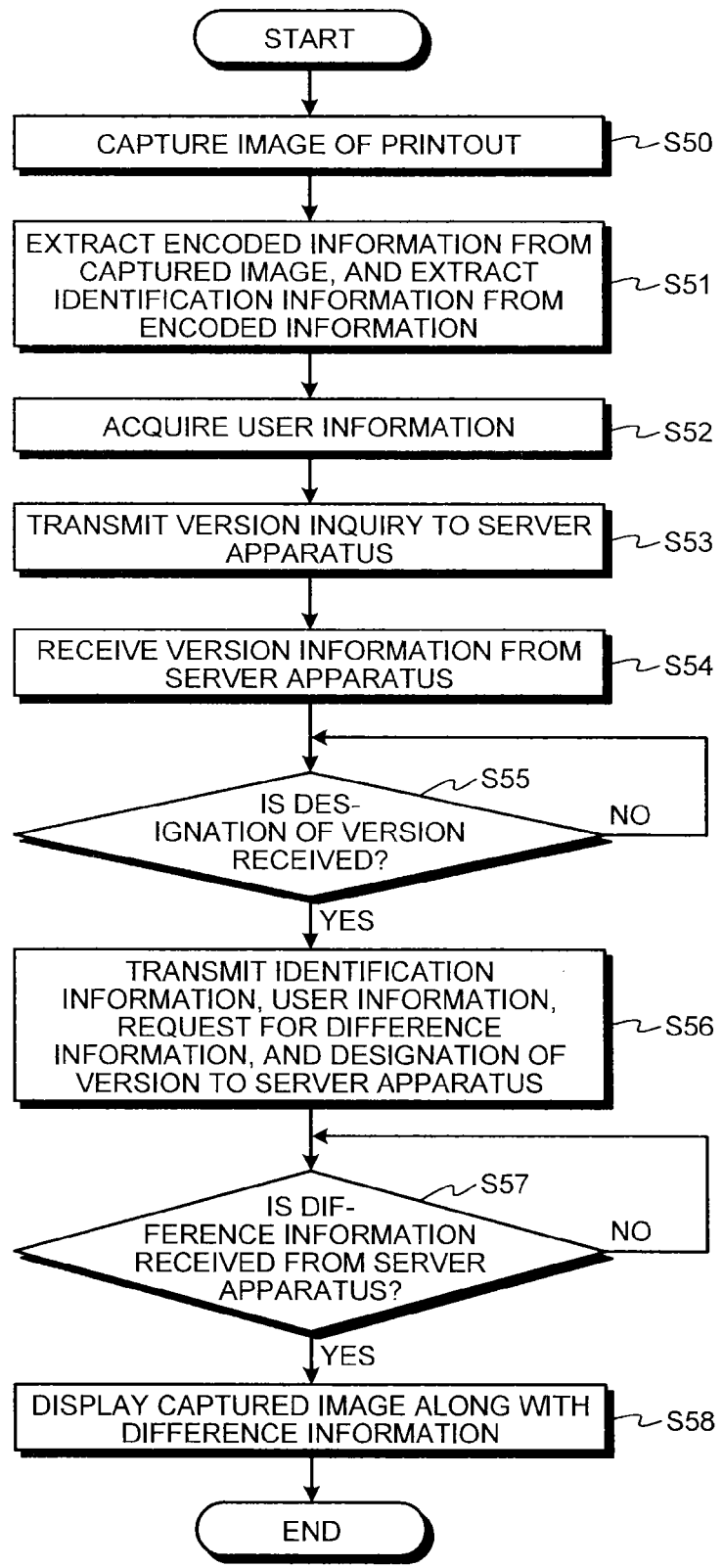
FIG. 16 is a flowchart illustrating a process flow of a display process of difference information in the portable terminal according to a third embodiment.

A display process of difference information in the portable terminal 100 is described below. FIG. 16 is a flowchart illustrating a process flow of the display process of difference information in the portable terminal according to the third embodiment. The display process is performed after the input receiving unit 114 has received an input to set the display mode to the designated difference display mode from a user through the input unit 104 and, in response thereto, the mode switching unit 115 has set the display mode to the designated difference display mode.

The image-capturing control unit 111 causes the camera 101 to capture an image of a printout (Step S50). Subsequently, the extracting unit 117 extracts encoded information from the captured printout image and extracts identification information from the extracted encoded information (Step S51). The user-information managing unit 118 acquires user information (Step S52).

The network control unit 112 transmits user information along with a version inquiry to the server apparatus 300 (Step S53), and receives version information as a response to the inquiry from the server apparatus 300 (Step S54). The input receiving unit 114 determines whether or not designation of a version entered by a user that desires difference information related to the designated version to be displayed is received (Step S55). When designation is not received (No at Step S55), the input receiving unit 114 is on standby until receiving designation.

On the other hand, when designation is received (Yes at Step S55), the network control unit 112 transmits the extracted identification information, the acquired user information, a request for difference information, and the designation of the version to the server apparatus 300 (Step S56). The image processing unit 116 determines whether or not difference information is received from the server apparatus 300 (Step S57). When difference information is not received (No at Step S57), the image processing unit 116 is on standby until receiving difference information.

On the other hand, when difference information is received (Yes at Step S57), the image processing unit 116 creates a composite image of the captured printout image and the received difference information, and the display control unit 113 causes the display unit 103 to display the composite image (Step S58).

Figure 17:
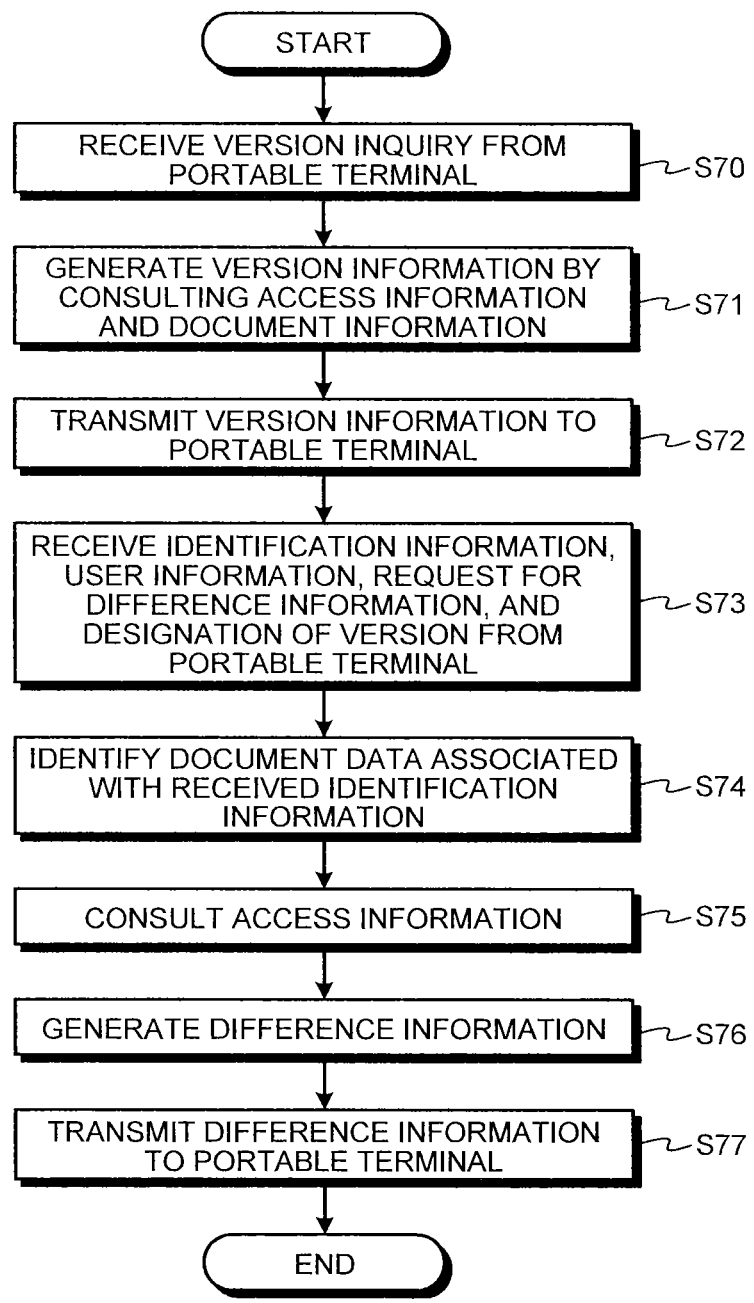
FIG. 17 is a flowchart illustrating a process flow of a display process of the difference information in the server apparatus according to the third embodiment.

A display process of the difference information in the server apparatus 300 is described below. FIG. 17 is a flowchart illustrating a process flow of the display process of the difference information in the server apparatus according to the third embodiment.

The network control unit 311 receives the user information along with the version inquiry from the portable terminal 100 (Step S70). The managing unit 313 generates version information by consulting the access information and the document information (Step S71). The network control unit 311 transmits the version information to the portable terminal 100 (Step S72).

The network control unit 311 then receives the identification information, the user information, the request for difference information, and the designation of the version from the portable terminal 100 (Step S73).

The identifying unit 314 identifies document data associated with the received identification information by consulting the document information (Step S74). The difference-information generating unit 315 consults the access information stored in the storage unit 330 (Step S75) to generate difference information within user's access right (Step S76).

The network control unit 311 transmits the generated difference information to the portable terminal 100 (Step S77).

In this way, in the image processing system according to the present embodiment, the portable terminal 100 captures an image of a printout produced by printing document data, and transmits identification information obtained by decoding encoded information contained in the captured image, a request for difference information, designation of a version, and the like to the server apparatus 300. In response thereto, the server apparatus 300 generates difference information between the document data and the designated version of the document data, and transmits the difference information to the portable terminal 100. The portable terminal 100 displays a composite image of the received difference information and the captured printout image. Thus, the portable terminal 100 can display the document data of the captured printout together with the difference between the document data of the printout and another version (version designated by a user) of the document data. Accordingly, the user can know contents of the designated version of the document data without printing the designated version of the document data, which increases convenience.

An example modification of the embodiments is described below. The image-capturing control unit recognizes text data contained in a printout, to which no encoded information is appended, by extracting a text portion from the printout and applying optical character recognition (OCR) to the text portion. By searching the server apparatus for this recognized text data, corresponding document data is identified. Meanwhile, the OCR operation and text-data search operation require large processing loads. Accordingly, higher speed can be achieved by using a cloud computing system rather than causing the operations to be performed by the portable terminal or the server apparatus. In this example, a captured image is not processed in the image-capturing control unit, and the document data is identified by sending requests for OCR and search for the document data to a cloud server. When the document is identified, it is possible to identify the version of the document data without transmitting identification information to the server apparatus. Accordingly, a display process of displaying difference information can be performed as in the embodiments.

According to an embodiment, convenience can be increased.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing system comprising a client apparatus and a server apparatus, wherein
the client apparatus includes:
an image capturing unit that captures an image of a printout produced by printing print data and encoded information, the encoded information being obtained by encoding identification information for identification of the print data;
an extracting unit that extracts the identification information by extracting the encoded information from the image captured by the image capturing unit and decoding the extracted encoded information;
a first transmitting unit that transmits the identification information extracted by the extracting unit to the server apparatus;
a first receiving unit that receives difference information representing difference between the print data of the printout and print data of a version that is different from a version of the print data of the printout, the difference information being transmitted from the server apparatus based on the identification information transmitted by the first transmitting unit; and
a display control unit that causes a display unit to display the image captured by the image capturing unit and the difference information received by the first receiving unit, and
the server apparatus includes:
a first storage unit that stores therein the print data and the identification information for identification of the print data in a manner associated with each other for each version of the print data,
a second receiving unit that receives the identification information transmitted from the client apparatus;
an identifying unit that identifies the print data stored in the first storage unit in a manner associated with the identification information corresponding to the identification information received by the second receiving unit among the identification information stored in the first storage unit;
a generating unit that generates the difference information from the print data identified by the identifying unit and the print data of the version that is different from the version of the print data identified by the identifying unit; and
a second transmitting unit that transmits the difference information generated by the generating unit to the client apparatus.

2. The image processing system according to claim 1, wherein
the client apparatus further includes a second storage unit that stores therein user information for identification of a user of the client apparatus,
the first transmitting unit transmits the identification information extracted by the extracting unit and the user information to the server apparatus,
the server apparatus further includes a third storage unit that stores therein the user information and access right in a manner associated with each other, the access right defining a version of print data to which the user is permitted to access,
the second receiving unit receives the identification information and the user information transmitted from the client apparatus, and the generating unit generates the difference information from the print data identified by the identifying unit and the print data of the version that is different from the version of the identified print data and permitted by the access right associated with the received user information.

3. The image processing system according to claim 2, wherein
the difference information represents difference between the print data identified by the identifying unit and print data of a latest version among one or more versions permitted by the access right associated with the received user information, and
the generating unit generates the difference information from the print data identified by the identifying unit and the latest version of the print data.

4. The image processing system according to claim 2, wherein
the client apparatus further includes an input receiving unit that receives designation of a version, the difference information from the print data of the printout with respect to which version is desired to be displayed,
the difference information represents difference between the print data identified by the identifying unit and print data of the designated version among one or more versions permitted by the access right associated with the received user information,
the first transmitting unit transmits the identification information extracted by the extracting unit, the user information, and the designation of the version to the server apparatus,
the second receiving unit receives the identification information, the user information, and the designation of the version transmitted from the client apparatus, and
the generating unit generates the difference information from the print data identified by the identifying unit and the designated version of the print data.

5. The image processing system according to claim 1, wherein
the client apparatus further includes a second storage unit that stores therein user information for identification of a user of the client apparatus,
the first storage unit stores therein the print data, the identification information of the print data, additional information of the print data, and a version of the print data in a manner associated with one another,
the first transmitting unit transmits the identification information extracted by the extracting unit and the user information to the server apparatus,
the server apparatus further includes a third storage unit that stores therein the user information and access right in a manner associated with each other, the access right defining a version of the print data to which the user is permitted to access,
the second receiving unit receives the identification information and the user information transmitted from the client apparatus, and
an acquisition unit acquires the additional information of the print data of a version that corresponds to the print data identified by the identifying unit and is permitted by the access right associated with the received user information.

6. A client apparatus connected to a server apparatus over a network, the client apparatus comprising:
an image capturing unit that captures an image of a printout produced by printing print data and encoded information, the encoded information being obtained by encoding identification information for identification of the print data;

an extracting unit that extracts the identification information by extracting the encoded information from the image captured by the image capturing unit and decoding the extracted encoded information;

a transmitting unit that transmits the identification information extracted by the extracting unit to the server apparatus;

a receiving unit that receives difference information representing difference between the print data of the printout and print data of a version that is different from a version of the print data of the printout transmitted from the server apparatus based on the identification information transmitted by the transmitting unit, the difference information being related to the print data; and a display control unit that causes a display unit to display the image captured by the image capturing unit and the difference information received by the receiving unit, wherein the server apparatus includes
- a first storage unit that stores therein the print data and the identification information for identification of the print data in a manner associated with each other for each version of the print data,
- a generating unit that generates the difference information from the print data identified by an identifying unit and the print data of the version that is different from the version of the print data identified by the identifying unit, and
- another transmitting unit that transmits the difference information generated by the generating unit to the client apparatus.

7. A method performed by a client apparatus connected to a server apparatus over a network, the method comprising:

capturing an image of a printout produced by printing print data and encoded information, the encoded information being obtained by encoding identification information for identification of the print data;

extracting the identification information by extracting the encoded information from the captured image and decoding the extracted encoded information;

transmitting the identification information extracted to the server apparatus;

receiving difference information representing difference between the print data of the printout and print data of a version that is different from a version of the print data of the printout transmitted from the server apparatus based on the transmitted identification information, the difference information being related to the print data;

causing a display unit to display the captured image and the received difference information;

storing the print data and the identification information for identification of the print data in a manner associated with each other for each version of the print data;

generating the difference information from an identified print data and the print data of the version that is different from the version of the identified print data; and transmitting the generated difference information to the client apparatus.

* * * * *